United States Patent
Moreno

(10) Patent No.: US 7,168,169 B2
(45) Date of Patent: Jan. 30, 2007

(54) ANTI-ROTATION DRIVE MECHANISM FOR A RECIPROCATING SAW

(75) Inventor: Jaime Moreno, Wheeling, IL (US)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 10/856,015

(22) Filed: May 28, 2004

(65) Prior Publication Data

US 2005/0262710 A1    Dec. 1, 2005

(51) Int. Cl.
  *B27B 19/00*    (2006.01)
  *B23D 49/10*    (2006.01)
(52) U.S. Cl. ............... 30/394; 30/392; 74/60; 173/114
(58) Field of Classification Search ............ 30/392, 30/393, 394; 74/50, 60; 173/114
See application file for complete search history.

(56) References Cited

U.S. PATENT DOCUMENTS

| | | | | |
|---|---|---|---|---|
| 2,824,455 A | * | 2/1958 | Ristow et al. .............. 74/60 |
| 3,461,732 A | * | 8/1969 | Gregory ................... 74/60 |
| 3,945,120 A | * | 3/1976 | Ritz ......................... 30/393 |
| 5,050,307 A | | 9/1991 | Palm |
| 5,566,458 A | * | 10/1996 | Bednar ..................... 30/392 |
| 5,689,891 A | * | 11/1997 | Bednar et al. ............. 30/394 |
| 6,234,255 B1 | * | 5/2001 | Feldmann et al. ......... 173/114 |
| 6,634,107 B2 | * | 10/2003 | Osada ...................... 30/392 |
| 6,662,455 B2 | * | 12/2003 | Tachibana et al. ......... 30/393 |
| 6,688,005 B1 | | 2/2004 | Tachibana et al. |
| 6,758,119 B1 | * | 7/2004 | Neitzell .................... 83/34 |

FOREIGN PATENT DOCUMENTS

| | | |
|---|---|---|
| EP | 1295662 | 3/2003 |
| GB | 2165794 | 4/1986 |
| WO | WO 98/07544 | 2/1998 |

* cited by examiner

*Primary Examiner*—Hwei-Siu Payer
(74) *Attorney, Agent, or Firm*—Greer, Burns & Crain, Ltd.

(57) ABSTRACT

An anti-rotation reciprocating drive apparatus for a reciprocating saw utilizes a wobble plate assembly that includes a drive shaft and an elongated arm with an interface structure for engaging a spindle. The interface structure has two ball-type interfaces that are concentrically aligned with one another, with the outer one being smaller than the inner one and both engaging a receiver portion of the spindle. The larger ball-type interface causes reciprocating movement of the spindle and the smaller outer interface prevents rotation of the spindle. The contact between the interfaces and the spindle receiver is a single point contact which reduces operating friction, wear of the parts and heat being generated.

12 Claims, 4 Drawing Sheets

ANTI-ROTATION DRIVE MECHANISM FOR A RECIPROCATING SAW

BACKGROUND OF THE INVENTION

The present invention generally relates to hand tools, and more particularly, to power reciprocating hand tools.

Reciprocating tools that are motor driven, such as saber saws, larger reciprocating saws and the like are usually driven by electric motors that have a rotating output shaft. Therefore, this rotating motion must be translated into reciprocating motion for moving a saw blade or the like in a reciprocating manner. While various types of mechanisms have been known in the art for translating the rotation motion into reciprocating motion, one common type of motion conversation mechanisms are wobble plate drives. A wobble plate drive shaft is typically connected to the motor through a gear arrangement that usually functions to reduce the speed of rotation of the motor output shaft and the wobble plate drive causes a wobble arm to reciprocate in a path that is parallel to the motion of the saw blade or the like which the wobble plate drive is used for. The blade of a reciprocating saw is mounted in a blade clamping mechanism that is located at the end of a spindle, the other end of which is operatively connected to a wobble arm.

In some prior art wobble plate drives, the spindle has a rectangular or square cross-section that is located in a rectangular or square opening to restrain the spindle from any movement other than reciprocating movement. While these noncircular cross-section spindles operate in a desirable manner, the noncircular cross-section increases the cost relative to a tubular spindle construction which is more desirable. However, a tendency of wobble plate drives for driving a spindle is to exert forces on the spindle which tend to cause it to rotate. Since rotation of the spindle would necessary rotate the reciprocating blade, such rotation must be prevented.

SUMMARY OF THE INVENTION

A preferred embodiment of the present invention is directed to an anti-rotation reciprocating drive apparatus for a reciprocating saw that utilizes a wobble plate assembly that includes a drive shaft and an elongated arm with an interface structure for engaging a spindle. The interface structure has two ball-type interfaces that are concentrically aligned with one another, with the outer one being smaller than the inner one and both engaging a receiver portion of the spindle. The larger ball-type interface causes reciprocating movement of the spindle and the smaller outer interface prevents rotation of the spindle. The contact between the interfaces and the spindle receiver is a single point contact which reduces operating friction, wear of the parts and heat being generated.

DETAILED DESCRIPTION

Figure 1:
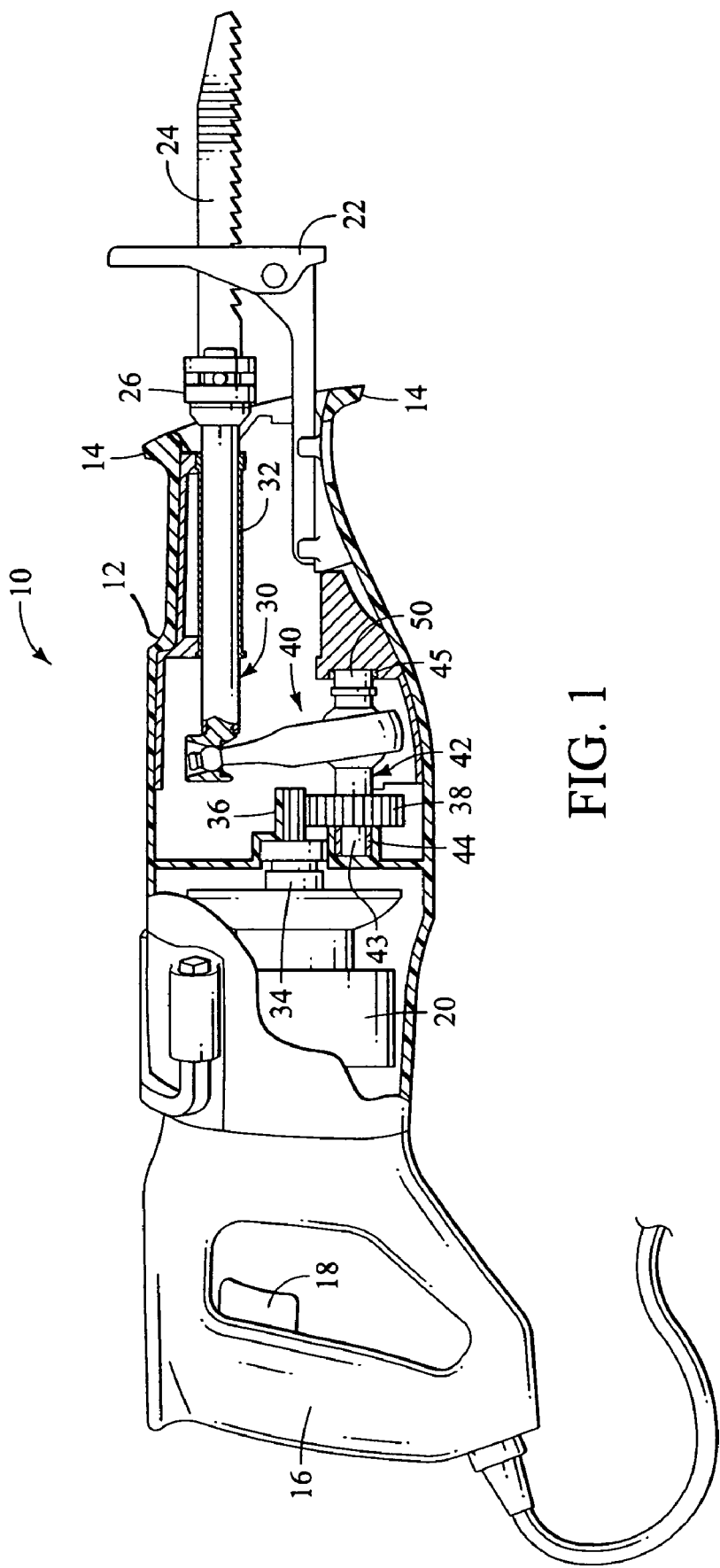
FIG. 1 is a side view of a preferred embodiment of a reciprocating saw of the present invention, shown partially in section and in simplified form.

The preferred embodiment of the present invention is shown in the drawings and is a reciprocating saw, the general size and shape of which is similar to saws that are currently marketed. The present invention is also adapted for other types of tools such as saber saws, for example, or other types of tools that have a reciprocating action and are powered by a motor having a rotating output shaft. As shown in FIG. 1, the reciprocating saw, indicated generally at 10, has an outer housing 12 which includes a nose portion 14 that is flared outwardly so that a user can hold the nose portion with one hand while holding a handle 16 with the other. A trigger switch 18 is provided in the handle portion for turning on a motor 20 that drives the tool. The saw has a shoe 22 at the nose end portion 14 and a saw blade 24 is mounted in a blade clamping mechanism 26 that is mounted at the end of an elongated spindle and receiver, indicated generally at 30, which is slideable in a hollow cylindrical sleeve 32. The motor 20 has an output shaft 34 with a pinion gear 36 mounted on the shaft 34, with the gear 36 engaging a larger gear 38 that is connected to a wobble plate assembly, indicated generally at 40, which drives the spindle and receiver 30 in a reciprocating manner as the gear 38 drives the wobble shaft assembly.

More particularly, the wobble shaft assembly 40 has a drive shaft indicated generally at 42, to which the gear 38 is attached. The shaft has an end portion 43 that is supported in a ball bearing 44 or the like and the shaft 42 has its opposite end supported in a ball bearing 45 that is mounted in the housing 12. It should be understood that the manner in which the motor 20, gears 36 and 38 as well as the shaft 42 are mounted in the structure is not in and of itself part of the present invention and the manner in which the housing is constructed and the rotating parts are supported is well known to those of ordinary skill in the art.

Figure 2:
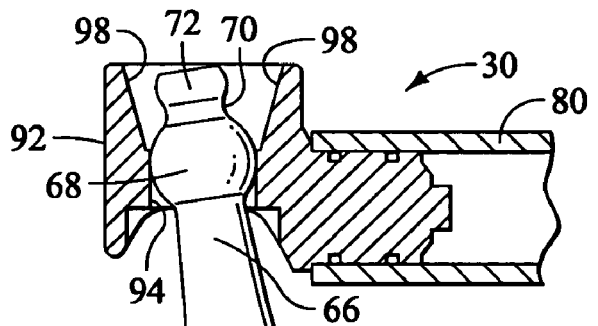
FIG. 2 is a side view of the preferred embodiment of the wobble plate assembly and a portion of the spindle and spindle receiver, with the latter shown partially in section.
Figure 5:
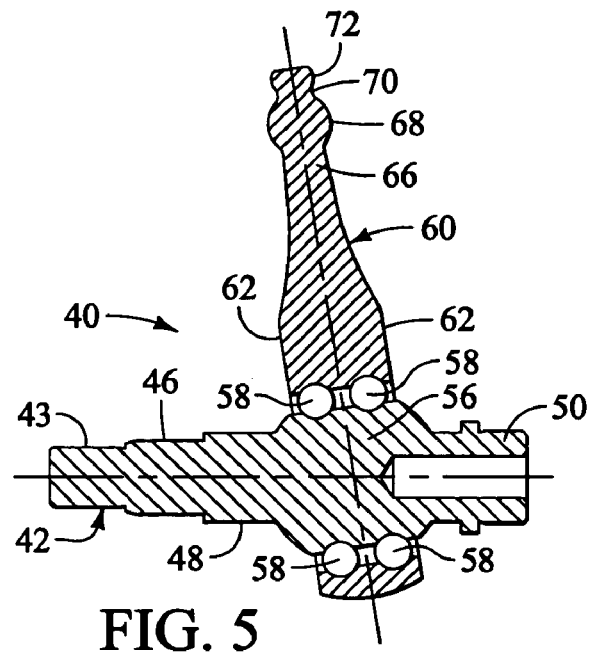
FIG. 5 is another view of the wobble plate assembly shown in section generally through the middle of the assembly.
Figure 4:
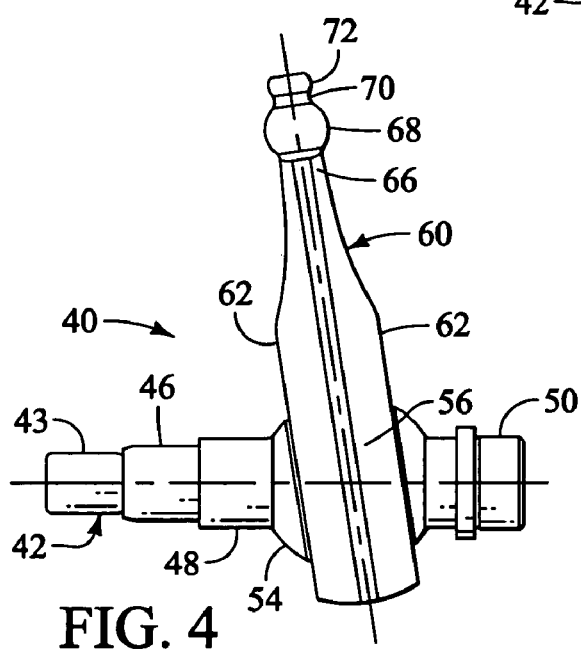
FIG. 4 is another side view of the wobble plate assembly of the preferred embodiment.
Figure 6:
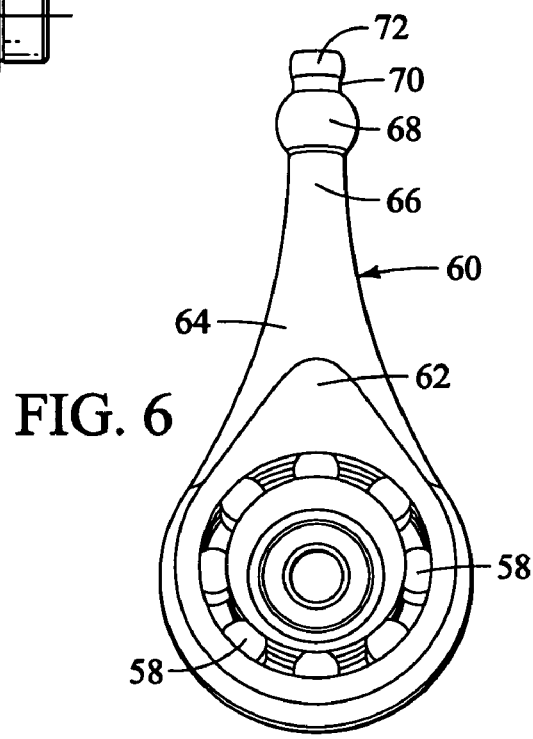
FIG. 6 is an end view of the wobble plate assembly shown in FIG. 4.
Figure 9:
FIG. 9 is a cross-section taken generally along the line 9—9 of FIG. 8.

With regard to the wobble plate assembly 40 and referring to FIGS. 4 and 5, the shaft 42 has different diameter portions 43, 46 and 48. with the smallest diameter end portion 43 being supported in the ball bearing 44, and the section 46 having the gear 38 mounted on it. The opposite end 50 is supported in ball bearings 45. An enlarged center portion 54 of the shaft 42 has a cylindrical shaped center portion 56 that is oriented at an acute angle relative to the axis of the shaft 42 as shown in FIG. 5 and ball bearings 58 are positioned to permit an elongated arm 60 to rotate relative to the cylindrical portion 56. As the shaft 42 is rotated, the angular orientation of the cylinder 56 changes so that the outer end of the arm 60 is moved in a reciprocating manner, i.e., to the left and right as shown in FIG. 2. As is shown in FIGS. 4–6, the arm 60 has generally flat sides 62 that extend from the bottom upwardly toward the outer end of the arm 60 and then merge into a curved portion that has an oval shape cross-section near the bottom at location 64 and which reduces in size and becomes circular shaped in cross-section near the outer end at location 66 where it merges with a first ball-type interface 68 that in turn merges into a generally cylindrical portion 70 that merges into a second ball-type interface 72. The interfaces 68 and 72 have a generally spherical form albeit truncated, where each merges with adjacent structure 66 and/or 70. It should be understood that these ball-type interface portions do not need to be strictly spherical but are desirably generally near-spherically curved so that point contact is made between these interfaces and the spindle and receiver 30.

Referring to FIGS. 1, 2 and 8–10, the spindle and receiver 30 has a tubular spindle 80 that merges into a right end solid generally circular section 82 that has a vertical slot 84 in which the shank end of the blade 24 may be inserted. The end 82 also has an aperture 86 in which a pin of the blade clamping mechanism 26 may be attached. At the opposite end of the spindle 80 is a receiver 88 that has a cylindrical extension 90 that is sized to closely fit within the interior of the tube portion 80 and which is also preferably braised to securely hold the two components together inasmuch as extreme forces are incurred by the spindle structure during operation.

Figure 3:
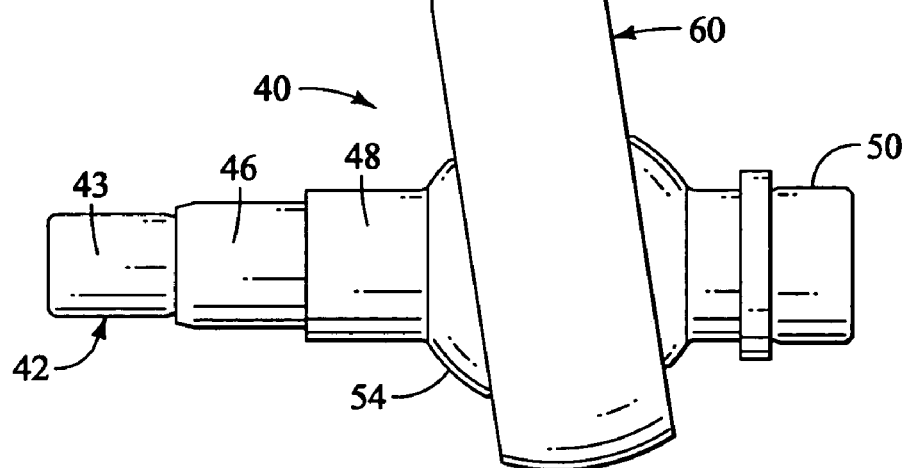
FIG. 3 is an end view of a portion of the wobble plate assembly and spindle receiver shown in FIG. 2, shown partially in section.
Figure 3:
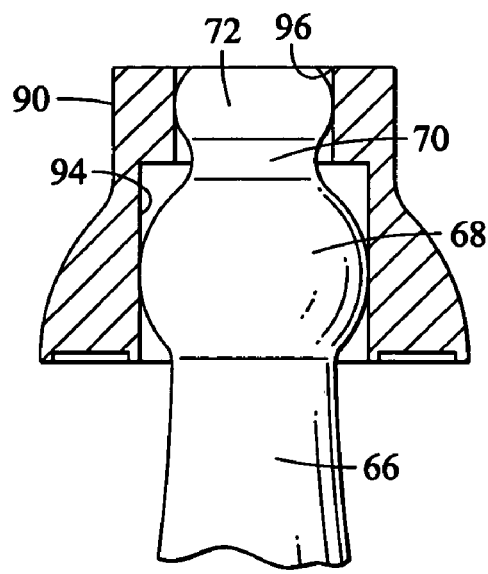
Figure 10:
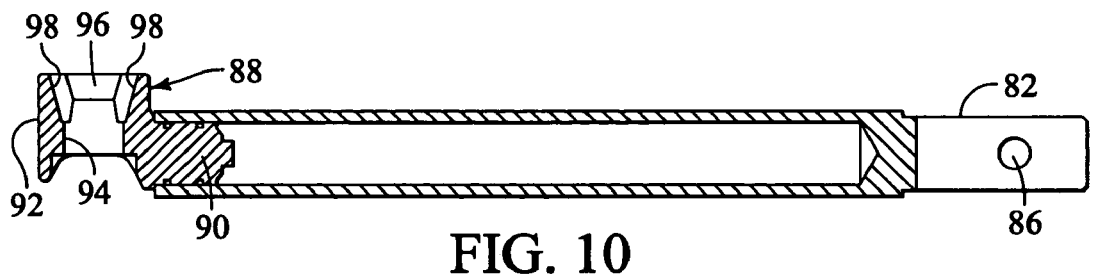
FIG. 10 is a cross-section taken generally along the line 10—10 of FIG. 8.
Figure 8:
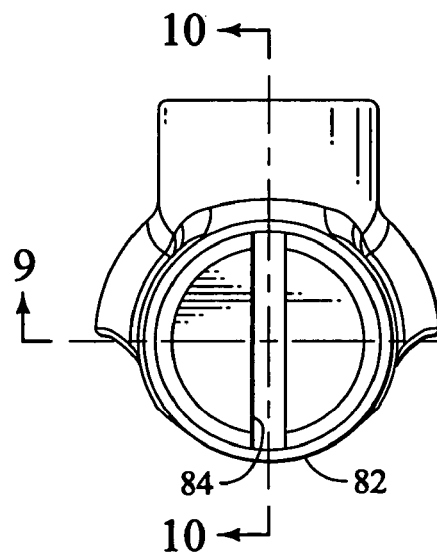
FIG. 8 is an end view of the spindle and receiver shown in FIG. 7.
Figure 7:
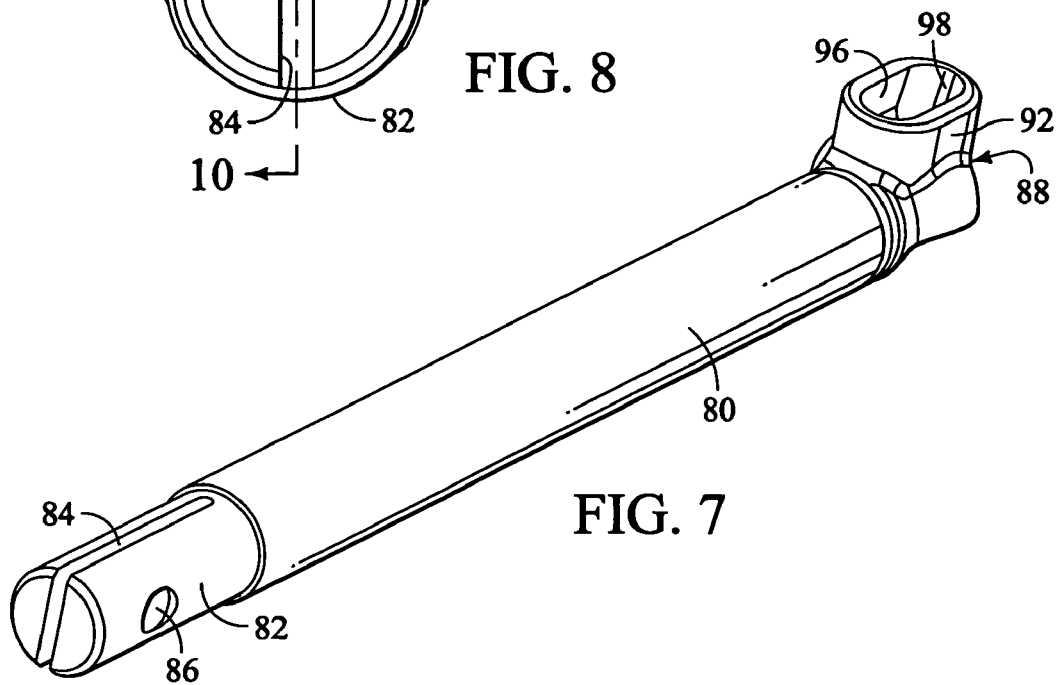
FIG. 7 is a perspective view of the spindle and receiver of the preferred embodiment.

The receiver has a main body portion 92 that has a circular opening 94 that merges into an elongated slot 96 the length of which is oriented in the same direction as the axis tubular portion 80 as shown in FIGS. 7 and 10. The ends of the slot 96 are flared outwardly as shown at 98 to accommodate the reciprocating motion that is caused by the elongated arm 40 and particularly the ball-type interfaces 68 and 72 that are positioned in the opening 94 and slot 96, respectively. As shown in FIGS. 2 and 3, the first ball-type interface 68 is positioned in the opening 94 with the outside of the interface being generally in a point contact with the sidewall of the opening 94. The second ball-type interface 72 also rides in the slot 96 and as is best shown in FIG. 3, the diameter of the interface 72 is only slightly smaller than the width of the slot and thereby effectively prevents the spindle from rotating.

Because of the preferably spherical-shaped configuration of the interfaces 68 and 72 which are positioned in the opening 94 and slot 96 have straight side wall straight surfaces in the vertical direction, there is only point contact between the interfaces and the sidewalls during the entire movement of the elongated wobble arm. This point contact results in the advantages of reduced wear between the interfaces and the receiver 88 and less heat generated during operation. Also, because of the curvature of the ball interface portions with the straight sidewalls, there is only point contact at all times, regardless of the tolerances and clearances between the parts. It is also preferred that grease be applied to the receiver to further reduce friction between the ball-type interfaces and the receiver.

An added advantage is achieved in that the point contact of the placement of the first ball interface 68 in the receiver 88 is at a vertical elevation relative to the tube portion 80 that is inside of the tube portion. This contact location applies reciprocating force to move the spindle, which location is close to the center of the tubular portion 80 as is desired.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A reciprocating drive apparatus comprising;
   a housing;
   a drive shaft rotatably mounted in said housing;
   an elongated spindle mounted in said housing for reciprocating motion, said spindle having a receiver at a first end thereof configured to engage a wobble plate interface structure;
   a wobble plate assembly mounted on said shaft and having an elongated arm with a wobble plate interface structure for engaging said spindle receiver;
   said interface structure comprising first and second ball-type interfaces concentrically aligned with each other, said first interface causing reciprocating motion of said spindle and said second interface preventing rotation of said spindle;
   wherein said first ball-type interface has a larger circumference than said second ball-type interface and said second interface is located at the outer end of said wobble plate assembly;
   said spindle receiver further comprising a first generally cylindrical opening oriented transversely of the length of the spindle configured to receive said first ball-type interface, said first interface contacting the inside surface of said opening of said receiver in a point contact relationship during reciprocation of said spindle;
   said spindle receiver defining an elongated slot with side walls extending outwardly from said cylindrical opening, said slot having its length oriented in the direction of reciprocating of said spindle,
   said second ball-type interface reciprocating in said slot during reciprocation of said spindle, the diameter of said second ball-type interface being slightly smaller than said slot width so that said second interface contacts said slot side walls in a point contact relationship during reciprocation of said spindle.

2. A reciprocating drive apparatus as defined in claim 1 wherein said point contact is at a location that approaches the center of said spindle.

3. A reciprocating drive apparatus as defined in claim 1 wherein said elongated spindle comprises a cylindrical member to which said receiver is attached.

4. A reciprocating drive apparatus as defined in claim 3 wherein said cylindrical member is a hollow tube and said receiver has a connecting portion that is inserted into said hollow tube and secured thereto.

5. A reciprocating drive apparatus as defined in claim 1 wherein said elongated arm has a generally circular cross section that decreases in size from its shaft end to said wobble plate interface structure at one end.

6. A reciprocating drive apparatus as defined in claim 1 wherein said wobble plate assembly comprises a wobble plate journaled in bearings at an acute angle relative to the axis of said shaft so that said wobble plate moves said arm in a reciprocating path parallel to the axis of said shaft during rotation of said shaft.

7. A reciprocating drive apparatus as defined in claim 1 wherein said first ball-type interface comprises a generally spherically shaped portion that merges with said arm at one end thereof and merges with said second ball-type interface at the opposite end thereof.

8. A reciprocating drive apparatus comprising;
   a housing;

a drive shaft rotatably mounted in said housing;
an elongated spindle mounted in said housing for reciprocating motion, said spindle having a receiver at a first end thereof configured to engage a wobble plate interface structure;
a wobble plate assembly mounted on said shaft and having an elongated arm with a wobble plate interface structure for engaging said spindle receiver;
said interface structure comprising first and second ball-type interfaces concentrically aligned with each other, said first interface causing reciprocating motion of said spindle and said second interface preventing rotation of said spindle;
wherein said second ball-type interface comprises a truncated generally spherically shaped portion that merges with said first ball-type interface at one end thereof and terminates in a generally flat surface at an opposite end portion thereof.

9. A reciprocating drive apparatus comprising;
a housing;
a drive shaft rotatably mounted in said housing;
an elongated spindle mounted in said housing for reciprocating motion, said spindle having a receiver at a first end thereof configured to engage a wobble plate interface structure;
a wobble plate assembly mounted on said shaft and having an elongated arm with a wobble plate interface structure for engaging said spindle receiver;
said interface structure comprising first and second ball-type interfaces concentrically aligned with each other, said first interface causing reciprocating motion of said spindle and said second interface preventing rotation of said spindle; and
a guide sleeve mounted in said housing and said spindle is slideably mounted in said sleeve.

10. A reciprocating saw comprising:
a housing;
a motor having a motor shaft located in said housing;
a drive shaft rotatably mounted in said housing parallel to said motor shaft;
a gear mechanism interconnecting said motor shaft and said drive shaft;
a wobble plate assembly mounted on said drive shaft and having an elongated arm with a wobble plate interface structure for engaging a spindle receiver;
an elongated spindle mounted in said housing for reciprocating motion, said spindle having a receiver at a first end thereof configured to engage said wobble plate interface structure, said receiver having a transversely oriented cylindrical opening that merges into an elongated slot opening, with said elongated slot opening having side walls for contacting said wobble plate interface structure;
said interface structure comprising first and second ball-type interfaces concentrically aligned with one another, said first interface causing reciprocating motion of said spindle by contacting said cylindrical opening side wall during operation and said second interface contacting said slot opening side wall to prevent rotation of said spindle during operation.

11. A reciprocating saw as defined in claim 10 wherein said first interface contacts said cylindrical opening substantially at a single point at any time during operation.

12. A reciprocating saw as defined in claim 10 wherein said second interface contacts said elongated opening substantially at a single point at any time during operation.

* * * * *